United States Patent
Angus et al.

(10) Patent No.: US 10,176,145 B2
(45) Date of Patent: Jan. 8, 2019

(54) INTERNET-OF-THINGS (IOT) EXTENDED PERIPHERAL SUPPORT FOR TERMINALS

(71) Applicants: Robin Ian Gregor Angus, Fife (GB); Jamie Cramb, Duluth, GA (US); Alexander John Haddow, Crieff (GB); Richard Han, Duluth, GA (US)

(72) Inventors: Robin Ian Gregor Angus, Fife (GB); Jamie Cramb, Duluth, GA (US); Alexander John Haddow, Crieff (GB); Richard Han, Duluth, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/607,855

(22) Filed: May 30, 2017

(65) Prior Publication Data

US 2018/0349314 A1    Dec. 6, 2018

(51) Int. Cl.
| | |
|---|---|
| *G06F 9/4401* | (2018.01) |
| *G06F 9/50* | (2006.01) |
| *G06F 9/54* | (2006.01) |
| *G06F 15/173* | (2006.01) |
| *G06F 9/30* | (2018.01) |

(52) U.S. Cl.
CPC .... *G06F 15/17343* (2013.01); *G06F 9/30003* (2013.01); *G06F 9/441* (2013.01); *G06F 9/4411* (2013.01); *G06F 9/5055* (2013.01); *G06F 9/54* (2013.01)

(58) Field of Classification Search
CPC ......... G06F 9/4411; G06F 9/5055; G06F 9/54
See application file for complete search history.

(56) References Cited

U.S. PATENT DOCUMENTS

| | | | | |
|---|---|---|---|---|
| 8,352,949 B1 * | 1/2013 | Kunath | ............... | H04L 67/02 718/103 |
| 9,614,371 B1 * | 4/2017 | Farkas | .............. | H02J 3/14 |
| 2011/0055854 A1 * | 3/2011 | Kawai | .............. | G06F 8/61 719/327 |
| 2014/0237488 A1 * | 8/2014 | Zysman | .............. | H04W 4/001 719/321 |
| 2016/0350695 A1 * | 12/2016 | Koltunov | ....... | G06Q 10/063112 |
| 2017/0090950 A1 * | 3/2017 | Sakamoto | ............ | G06F 9/441 |
| 2017/0116137 A1 * | 4/2017 | Hough | ............... | G06F 9/44505 |

* cited by examiner

*Primary Examiner* — Glenn A. Auve
(74) *Attorney, Agent, or Firm* — Schwegman, Lundberg & Woessner

(57) ABSTRACT

An IoT device is provided and includes a peripheral Operating System (OS), a peripheral API, and a remote management application. The IoT device configured to provide extended peripheral support for additional peripherals accessible to a terminal in an isolated environment from the terminal environment and the IoT device exposes the extended peripherals as IoT devices accessible over multiple communication channels and the Internet.

4 Claims, 5 Drawing Sheets

INTERNET-OF-THINGS (IOT) EXTENDED PERIPHERAL SUPPORT FOR TERMINALS

BACKGROUND

Existing Point-Of-Sale (POS) terminals and Self-Service Terminals (SSTs) have architectures with a tightly coupled relationship between the host Personal Computer (PC) and any attached peripheral devices, such that adding an additional peripheral device becomes a laborious and time-consuming exercise. The tightly coupled relationship between the terminals and their underlying peripheral device drivers is for the most part done for security reasons to ensure the terminal does not become compromised by viruses and/or hackers. It is also done to ensure that the terminals continue to function with maximum availability and without downtime due to unexpected failures. This is especially important for a particular type of SST, an Automated Teller Machine (ATM). Furthermore, because of the tightly coupled relationship any changes to the underlying Operating System (OS), applications, and/or device drivers requires substantial retesting and redevelopment is often needed to ensure that access to the attached peripheral devices are not impacted. Similarly, when hardware modules are revised or swapped out for new modules, substantial retesting and redevelopment is needed to ensure proper access to the attached peripheral devices.

Conversely, appliance clients are hardware devices commonly referred to as Internet-of-Things (IoT) devices, such devices do not require any significant configuration or management and are often entirely managed remotely over a network connection with little to no effort on the part of the end users. However, adding additional peripheral devices or hardware is often prohibited or substantially restricted because the underlying OS of such devices is locked down, which makes for improved security but makes IoT devices extremely inflexible and available for just a specific function or use and not much else. Furthermore, many IoT devices lack or have a fairly restricted number of available hardware peripheral ports available, such that adding a peripheral device is prohibited and often only done through wireless connections only.

Both terminals (as referenced above) and IoT devices have improved security over conventional computing devices because access to the hardware and underlying OS is severely restricted. However, both the terminals and the IoT devices are extremely difficult to extend with added functionality for additional peripheral devices.

SUMMARY

In various embodiments, methods and an IoT device for IoT extended peripheral support of terminals are presented.

According to an embodiment, a method for IoT peripheral access from a terminal is presented. Specifically, and in an embodiment, a peripheral Application Programming Interface (API) is provided for accessing a plurality of peripherals controlled by the device. A peripheral command is received through the peripheral API and processed with a specific peripheral interfaced to the device. The peripheral command originating from a second device.

DETAILED DESCRIPTION

Figure 1A:
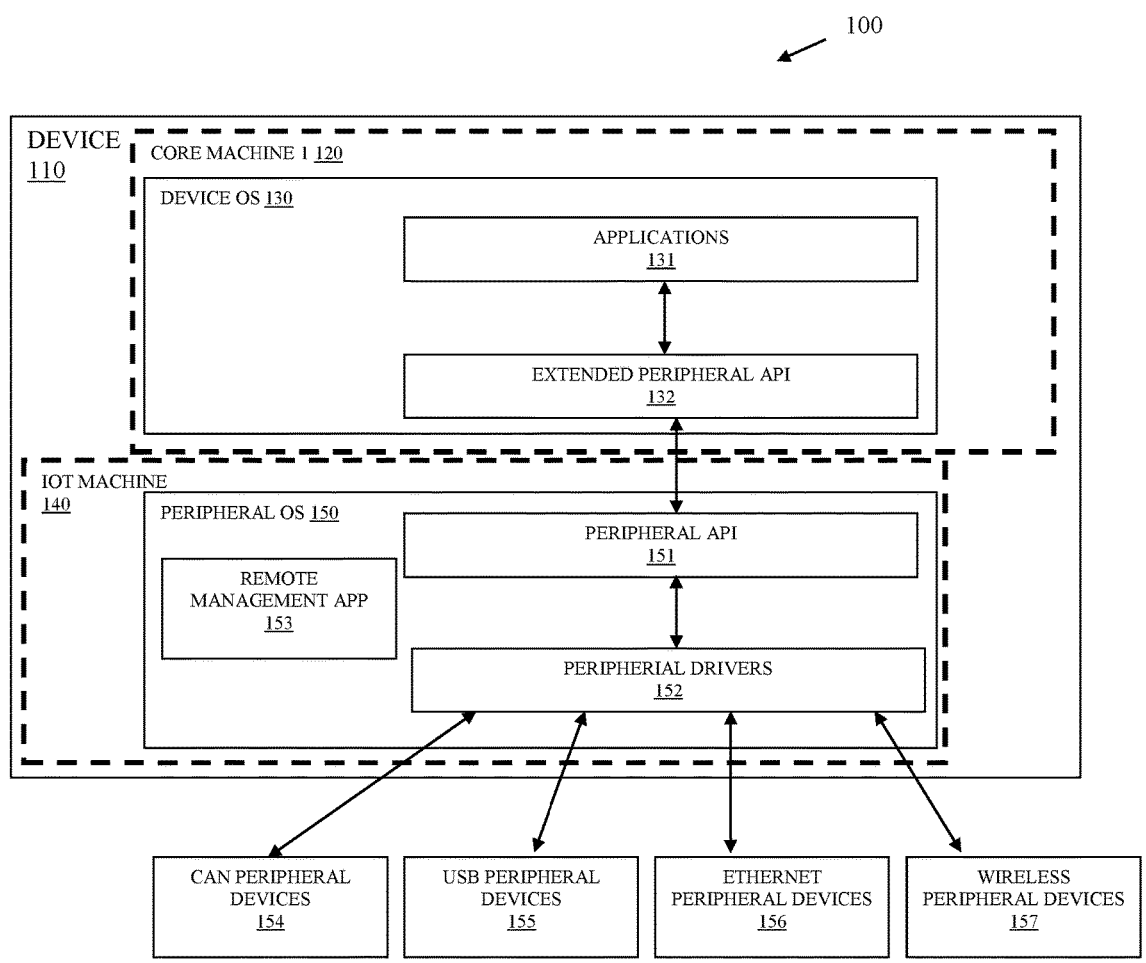
FIG. 1A is a diagram of an IoT peripheral control system, according to an example embodiment.

FIG. 1A is a diagram of an IoT peripheral control system 100, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of IoT peripheral control, presented herein and below.

The system 100 includes a device 110 having a first machine 120 and an IoT machine 140. The first machine 120 includes a device OS 130; loaded and processing within the device OS 130 are applications 131 and an extended peripheral Application Programming Interface (API) 132. The IoT machine 140 includes a peripheral OS 150; loaded and processing with the peripheral OS 150 is a peripheral API 151, peripheral device drivers 152, and a remote management application (app) 153. The peripheral device drivers 150 providing access to a variety of peripheral devices 153-156, such as Controller Area Network (CAN) peripherals 153, Universal Serial Bus (USB) peripherals 154, Ethernet peripherals 155, and wireless peripherals 156 (Bluetooth®, Low Energy (LE) Bluetooth®, Radio Frequency (RF), Wi-Fi, etc.).

The system 100 includes a single device 110 having two separate machines 120 and 140. In an embodiment, the two machines 120 and 140 include their own separate hardware processors, motherboards, memory, etc.; such that there is a hardware and physical separation between the first machine 120 and the second machine 140. In an embodiment, the two machines 120 are both Virtual Machines (VM) 120 and 140; such that there is a logical separation between the two machines 120 and 140 but the two machines share one or more hardware processors, bus connections, memory, etc.

The first machine 120 is modified such that when access to a peripheral device (153-156) is needed the request is intercepted on the OS 130 and processed through the extended peripheral API 132 as one or more peripheral-access commands. The API 132 provides peripheral-specific hardware and peripheral OS 150 formats for the peripheral-access commands to the peripherals 154-157. The API calls are communicated to the peripheral API 151. Communication between APIs 132 and 151 can occur in a variety of manners, such as through bus connections, through specified communication ports monitored by both APIs 132 and 151, through a shared memory or storage location, and the like.

The API 151 receives the hardware and OS-independent commands from API 132 and translates those commands into specific device driver commands for specific peripherals. The device drivers 152 then directly communicate peripheral-recognized commands to the appropriate peripherals 154-157. Results from processing the commands by the peripherals 154-157 are passed back from the peripherals 154-157 to the device drivers 152 where the API 151 translates into the hardware and OS-independent communications and provides to API 132. The API 132 then provides to the applications 131.

In an embodiment, the APIs 132 and 151 are available through a web services interface that is browser based and provides translation to specific supported peripherals 154-157.

In this way, the application processing environment (OS 130 of machine 120) is divorced and decoupled from the processing environment of the OS 150 of the IoT machine 140 where the peripherals 154-157 are accessed and controlled. This means that upgrades to the OS 130 can occur without effecting or changing operability between the applications 130 and the peripherals 154-157. Additionally, the hardware and OS 150 associated with the peripherals 154-157 is isolated and controlled within machine two 140, such that upgrades can be controlled and tested with less dependencies and divorced and decoupled from the OS 130 and the applications 131.

Additionally, new peripheral devices can be added for access from device 110 by installing the appropriate peripheral device drivers 152 on the IoT machine and adding any applications for accessing those peripherals to device 110. This means that device 110 can remain a secure device and can extend its functionality with new peripherals through a single connection between the device 110 and the IoT device 140.

The IoT device 140 also includes a remote management app 153. This permits a separate remote connection to a remote server for maintenance and support of the IoT device 140. The IoT device 140 is under control of the remote server through the remote management app 153. The remote management app 153 provides processing for the remote server to: perform IoT device configuration, perform peripheral device configuration, perform security certificate management, perform software updates, obtain IoT device status reporting, obtain peripheral device status reporting, initiate and control log recording, and obtain log retrieval information.

In an embodiment, the device 110 is a Self-Service Terminal (SST). In an embodiment, the SST is an Automated Teller Machine (ATM). In an embodiment, the SST is a kiosk.

In an embodiment, the device 110 is a Point-Of-Sale (POS) terminal operated by a cashier on behalf of a customer during a checkout process.

In an embodiment, the device 110 is a digital sign.

In an embodiment, the APIs 132 and 151 are compliant with or a version of the European Committee for Standardization (CEN) eXtensions for Financial Services (XFS) API.

In an embodiment, the APIs 132 and 151 are in an eXtensible Markup Language format (XML).

In an embodiment, the device 110 maintains some peripheral device drivers within the OS 130 while other peripheral device drivers 152 for access to other peripherals 154-157 are controlled through the IoT device 140. In an embodiment, the device drivers that remain in the OS 130 include supported for integrated peripherals that include: a currency dispenser, a card reader, a touchscreen, and an encrypted PIN pad. In fact, any pre-existing and supported peripherals can remain controlled from device 110 and new extended peripherals to extended the functionality available from device 110 are added as peripherals 154-157.

In an embodiment, the peripherals 154-157 can include one or more of a: display, touchscreen, PIN pad, audio speaker, currency dispenser, a coin dispenser, disk drive, a biometric scanner (palm, retinal, fingerprint, face, voice, etc.), printer, safe lock, card reader, scanner, keyboard, camera, video camera, USB access port for connecting a peripheral, secure digital (SD) slot for receive an SD memory card, microphone, cash drawer, monitor port (VGA, HDMI, etc.) for connecting a monitor, Bluetooth® transceiver, LE Bluetooth® transceiver, RF reader/transmitter, Wi-Fi transceiver, I2C port, and others.

In an embodiment, at least one peripheral 154-157 is itself an IoT device, such a voice-enabled network device (Amazon® Echo™, Google® Home™, Apple® Siri™, and the like).

In an embodiment, the device 110 is an ATM and the ATM controls a plurality of other ATMs, wherein the other ATMs are slaves or thin clients to the ATM (sometimes referred to as a robot ATM).

In an embodiment, the IoT controlled peripherals 154-157 are exposed over multiple communication channels (Omni-channel access). For example, access over a Wide-Area Network (WAN), access over a Local-Area Network (LAN), wireless mobile access, and the like.

Figure 1B:
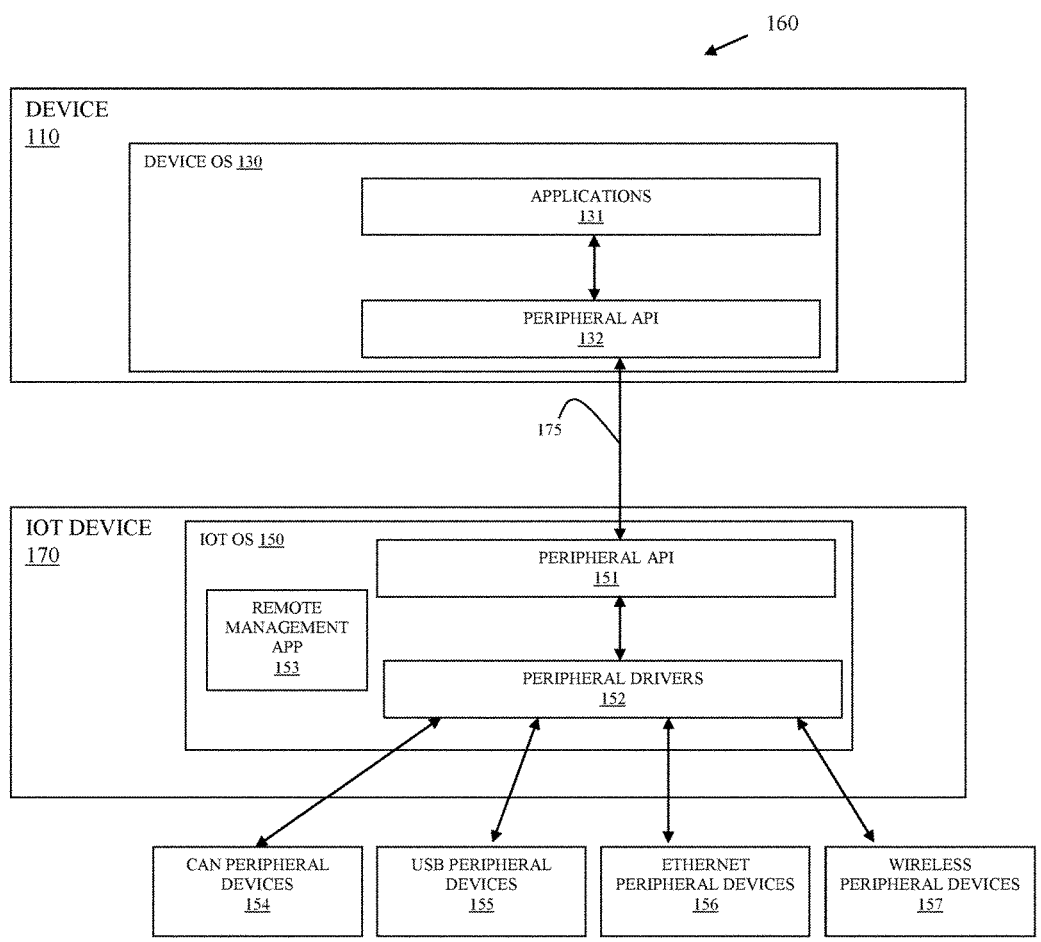
FIG. 1B is a diagram of another IoT peripheral control system, according to an example embodiment.

FIG. 1B is a diagram of another IoT peripheral control system 160, according to an example embodiment.

The system 160 illustrates a different embodiment from that which was shown with the system 100. Specifically, the OS 130 resides on a hardware device 110 that is physically separated and different from IoT device 170, which includes OS 150. There is a connection 175 made between the two physically separated devices 110 and 170. This connection 175 can be a wired connection such as Ethernet or can be a wireless connection such as Wi-Fi, Bluetooth®, LE Bluetooth®, etc.

So, the two devices 110 and 170 can be connected through Ethernet or USB and integrated under a same housing with two separate motherboards or the two devices 110 and 170 can be geographically separated and connected over a wireless network connection with one another.

In an embodiment, the device 170 is a hardware and software gateway that the device 110 can connect to for access to the peripheral devices 153-156 using API 132. In an embodiment, connection access can be based on Automotive, Network Communication, and/or Server domain controllers.

In an embodiment, the system 160 permits Omni-channel access from a variety of disparate platforms based on the hardware separation and isolation of device 170 from the connecting device 110. The access can be achieved as an integrated device (such as shown in the FIG. 1A) under a common housing or through remote a geographically dispersed network connections (such as in one embodiment of the FIG. 1B).

Logically and/or physically separating devices that process applications from devices that are connected to and control peripherals provides improved: peripheral access and connectivity, platform integration with Omni-channel access to peripherals, extended peripheral support for new peripherals available in the industry, security (since security can be isolated and enforced in both environments (application and peripheral), and/or accelerated development (since changes in the OS for the application environment do not impact accessibility and interoperability to the OS controlling the peripherals).

In an embodiment the IoT device 170 supports extended peripheral control and support for a plurality of terminal devices including device 110 and one or more additional devices (one-to-many support as opposed to the previous embodiments that discussed one-to-one support).

These and other embodiments are now discussed with reference to the FIGS. 2-4.

Figure 2:
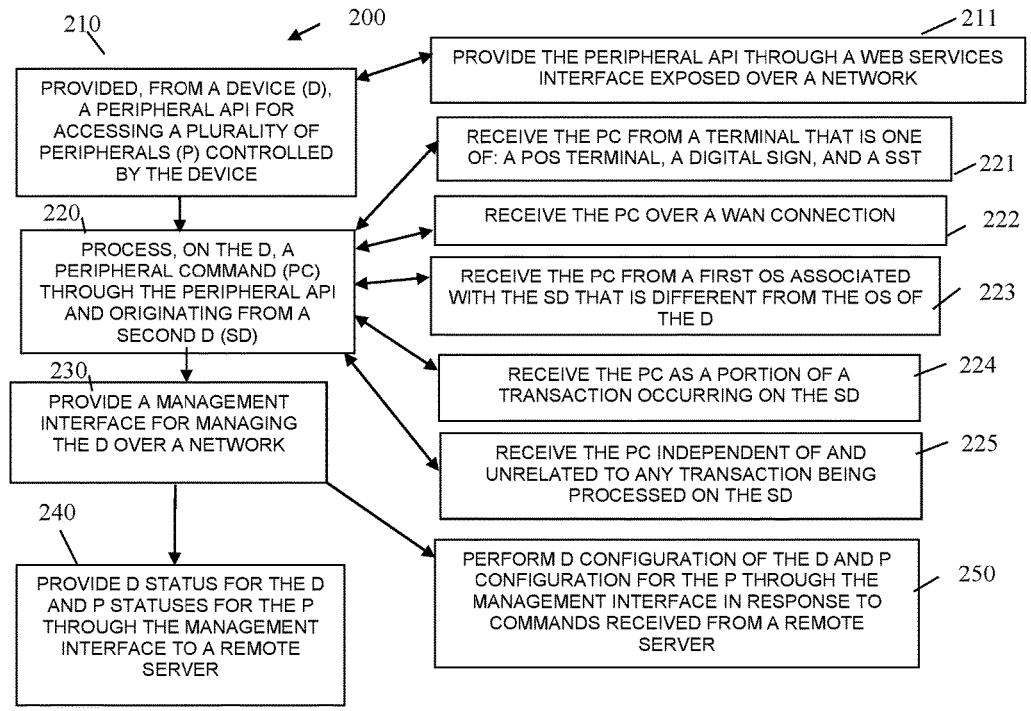
FIG. 2 is a diagram of a method for IoT peripheral access from a terminal, according to an example embodiment.

FIG. 2 is a diagram of a method 200 for IoT peripheral access from a terminal, according to an example embodiment. The software module(s) that implements the method 200 is referred to as an "IoT peripheral controller." The IoT peripheral controller is implemented as executable instructions programmed and residing within memory and/or a non-transitory computer-readable (processor-readable) storage medium and executed by one or more processors of a device. The processor(s) of the device that executes the peripheral controller are specifically configured and programmed to process the IoT peripheral controller. The IoT peripheral controller has access to one or more network connections during its processing. The network connections can be wired, wireless, or a combination of wired and wireless.

In an embodiment, the device that executes the IoT peripheral controller is the device 110; the IoT peripheral controller is processed by the machine 140, where the machine 140 is a second VM having OS 150 that is separate and different from machine 110 processed as a first VM having OS 130 that processes applications for device 110.

In an embodiment, the device that executes the IoT peripheral controller is device 170, which is a separate physical device from device 110 where applications are processed.

In an embodiment, the IoT peripheral controller is a combination of the API 151 and the remote management app 153.

In an embodiment, the IoT peripheral device(s) are any of the peripheral devices 154-157 discussed above with the FIGS. 1A-1B.

In an embodiment, the IoT peripheral controller provides extended peripheral support for a terminal. In an embodiment, the terminal is a digital sign. In an embodiment, the terminal is a SST. In an embodiment, the SST is an ATM. In an embodiment, the SST is a kiosk.

At 210, the IoT peripheral controller provides (from the device that executes the IoT peripheral controller) a peripheral API for accessing a plurality of peripherals controlled by the device.

According to an embodiment, at 211, the IoT peripheral controller provides the peripheral API through a web services interface exposed over a network.

At 220, the IoT peripheral controller processing, on the device, a peripheral command through the peripheral API. The peripheral command originating from a second (external) device from the device that processes the IoT peripheral controller.

In an embodiment, at 221, the IoT peripheral controller receives the peripheral command from a terminal device that is one of: a POS terminal, a digital sign, and a SST.

In an embodiment, at 222, the IoT peripheral controller receives the peripheral command over a Wide-Area Network (WAN) connection.

In an embodiment, at 223, the IoT peripheral controller receives the peripheral command from a first OS associated with the second device and the first OS is different from the OS of the device that processes the IoT peripheral controller.

In an embodiment, at 224, the IoT peripheral controller receives the peripheral command as a portion of a transaction occurring on the second device. That is, the second device is a terminal device (such as a POS terminal and a SST) where a customer is transacting with an enterprise and as a portion of that transaction, the terminal device sends the peripheral command to the IoT peripheral controller for accessing a specific peripheral needed for the transaction.

In an embodiment, at 225, the IoT peripheral controller receives the peripheral command independent of and unrelated to any transaction being processed on the second device.

According to an embodiment, at 230, the IoT peripheral controller, provides a management interface for remotely managing the peripherals and the device that processes the IoT peripheral controller over a network.

In an embodiment of 230, and at 240, the IoT peripheral controller provides a device status for the device and peripheral statuses for the peripherals through the management interface to a remote server.

In an embodiment of 230, and at 250, the IoT peripheral controller performs device configuration of the device that executes the IoT peripheral controller and peripheral configuration for the peripherals through the management interface in response to commands received from a remote server over the network.

Figure 3:
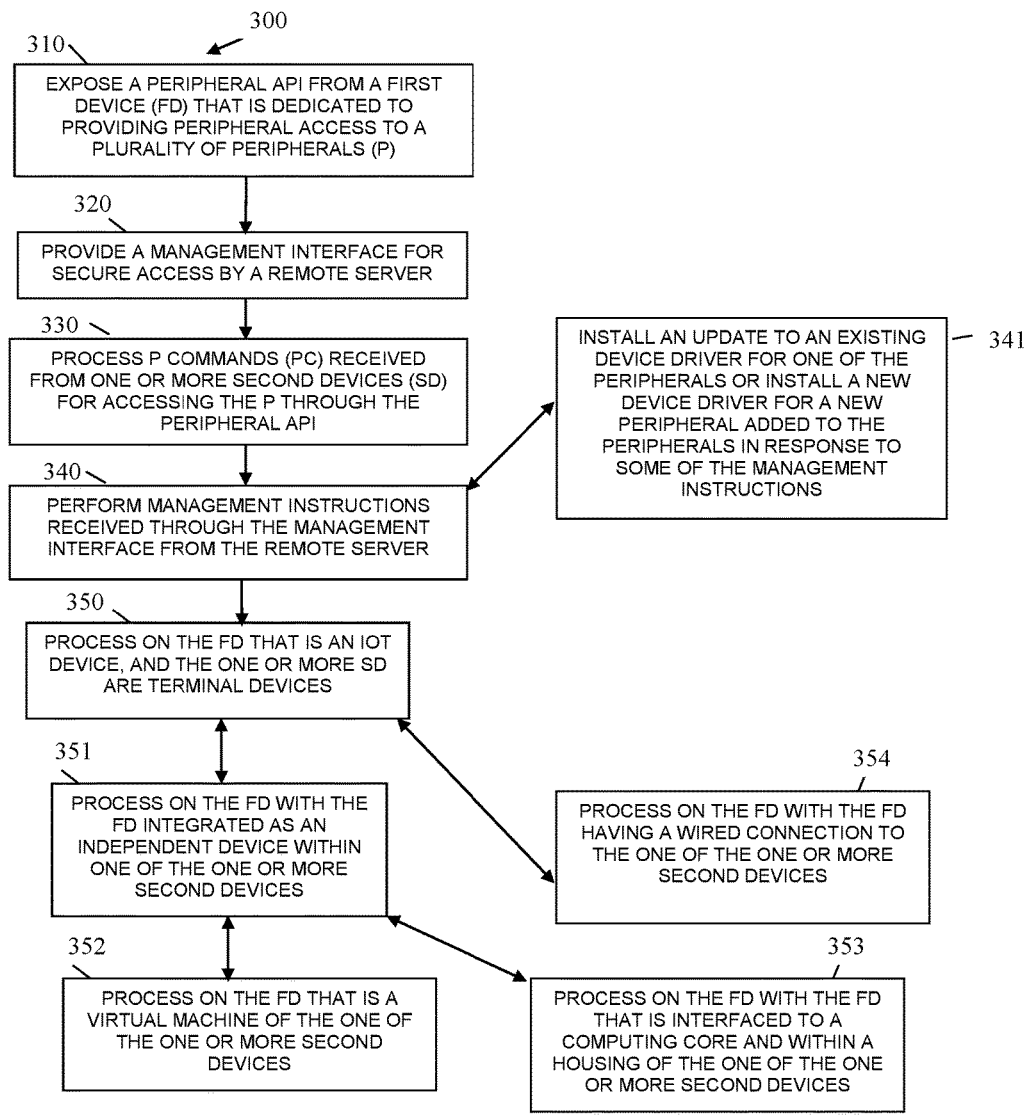
FIG. 3 is a diagram of a method for IoT peripheral control, according to an example embodiment.

FIG. 3 is a diagram of a method 300 for IoT peripheral control, according to an example embodiment. The software module(s) that implements the method 300 is referred to as an "IoT peripheral manager." The IoT peripheral manager is implemented as executable instructions programmed and residing within memory and/or a non-transitory computer-readable (processor-readable) storage medium and executed by one or more processors of a device. The processors that execute the IoT peripheral manager are specifically configured and programmed to process the peripheral manager. The IoT peripheral manager has access to one or more network connections during its processing. The network connections can be wired, wireless, or a combination of wired and wireless.

In an embodiment, the device that executes the IoT peripheral manager is the device 110; the peripheral manager is processed by the machine 140, where the machine 140 is a second VM having OS 150 that is separate and different from machine 120 processed as a first VM having OS 130 that processes applications for device 110.

In an embodiment, the device that executes the IoT peripheral manager is device 170, which is a separate physical device from device 110 where applications are processed.

In an embodiment, the IoT peripheral manager is a combination of the API 151 and the remote management app 153.

In an embodiment, the peripheral device(s) are any of the peripheral devices 154-157 discussed above with the FIGS. 1A-1B.

In an embodiment, the IoT peripheral manager provides extended peripheral support to one or a plurality of terminals. In an embodiment, the terminal is a POS terminal. In an embodiment, the terminal is a digital sign. In an embodiment, the terminal is a SST. In an embodiment, the SST is an ATM. In an embodiment, the SST is a kiosk.

In an embodiment, the IoT peripheral manager illustrates another and in some ways enhanced perspective of the method 200.

At 310, the IoT peripheral manager exposes a peripheral API from a first device (that executes the IoT peripheral manager), and the first device is dedicated to providing peripheral access to a plurality of peripherals.

At 320, the IoT peripheral manager provides a management interface for secure access to the first device by a remote server over a network connection.

At 330, the IoT peripheral manager processes peripheral commands received from one or more second devices for accessing the peripherals through the peripheral API.

At 340, the IoT peripheral manager performs management instructions received through the management interface from the remote server.

In an embodiment, at 342, the IoT peripheral manager installs an update to an existing device driver for one of the peripherals or installs a new device driver for a new peripheral added to the peripherals in response to some of the management instructions.

According to an embodiment, at 350, the IoT peripheral manager is processed on the first device, and the first device is an IoT device and the one or more second devices are terminal devices (POS terminals, digital signs, and SSTs).

In an embodiment of 350 and at 351, the IoT peripheral manager processes on the first device where the first device is integrated as an independent device within a particular one (particular device) of the one or more second devices.

In an embodiment of 351 and at 352, the IoT peripheral manager processes on the first device where the first device is a VM of the particular device.

In an embodiment of 351 and at 353, the IoT peripheral manager processes on the first device where the first device is interfaced to a computing core and within a housing of the particular device.

In an embodiment of 350 and at 354, the IoT peripheral manager processes on the first device with the first device having a wired connection to the particular device. That is, the first device is an externally interfaced device to the particular device through a wired connection (such as USB or Ethernet).

Figure 4:
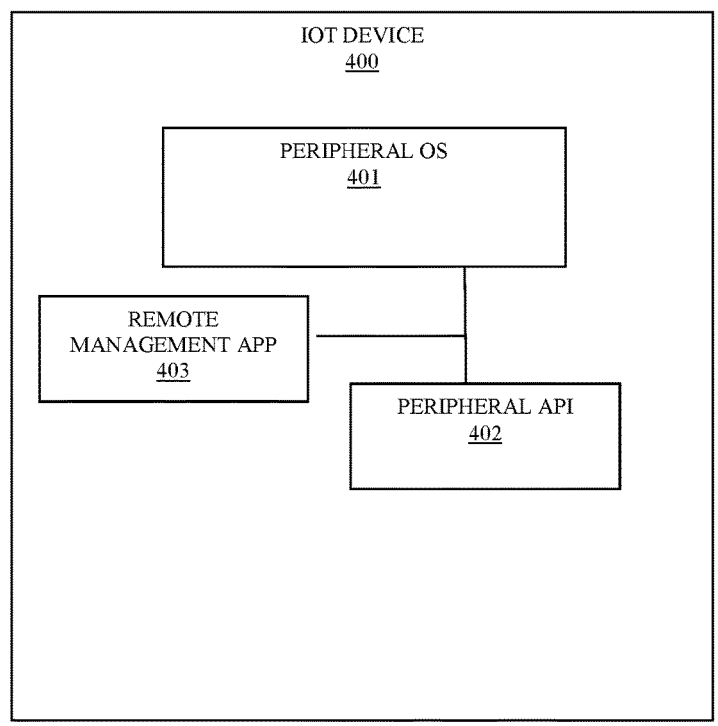
FIG. 4 is a diagram of an IoT device, according to an example embodiment.

FIG. 4 is a diagram of an IoT device 400, according to an example embodiment. The IoT device 400 includes a variety of hardware components and software components. The software components of the IoT device 400 are programmed and reside as executable instructions within memory and/or a non-transitory computer-readable medium and execute on one or more processors of the IoT device 400. The IoT device 400 may communicate over one or more networks, which can be wired, wireless, or a combination of wired and wireless.

In an embodiment, the IoT device 400 is the device 150 of the FIG. 1A.

In an embodiment, the IoT device 400 is the device 170 of the FIG. 1B.

In an embodiment, the IoT device 400 performs all or some combination of the processing discussed above for the device 150, the device 170, the method 200, and/or the method 300.

The IoT device 400 provides extended peripheral support for peripherals accessible by a terminal. In an embodiment, the terminal is a digital sign. In an embodiment, the terminal is a POS terminal. In an embodiment, the terminal is an ATM. In an embodiment, the terminal is a kiosk.

In an embodiment, the peripheral(s) discussed with the IoT device 400 are any of the peripherals 154-157 discussed above with the FIGS. 1A-1B.

The IoT device 400 includes a peripheral OS 401, a peripheral API 402, and remote management application (app) 403.

In an embodiment, the peripheral OS 401 is the peripheral OS 150.

In an embodiment, the peripheral API 402 is the peripheral API 151.

In an embodiment, the remote management app 403 is the remote management app 153.

The peripheral OS 401 is configured to execute on at least one processor of the IoT device 400 and load and process the peripheral API 402 and the remote management application 403.

The peripheral API is exposed to one or more devices for receiving and processing peripheral commands with peripherals interfaced to the IoT device 400.

The remote management application 403 is configured to provide remote monitoring and management for the peripherals and the IoT device 400 to a remote server.

In an embodiment, the IoT device 400 is interfaced to at least one of the devices through a wired connection.

In an embodiment, the peripheral API 402 is configured to expose the peripherals as other and independent IoT devices accessible to the devices over a network connection through an exposed web services interface.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
exposing a peripheral Application Programming Interface (API) from a first device that is dedicated to providing peripheral access to a plurality of peripherals;
providing a management interface for secure access by a remote server;
processing peripheral commands received from one or more second devices for accessing the peripherals through the peripheral API;
performing management instructions received through the management interface from the remote server; and
processing the method on the first device that is an Internet-of-Things (IoT) device, and the one or more second devices are terminal devices, wherein processing further includes processing the method on the first device with the first device integrated as an independent device within one of the one of the one or more second devices.

2. The method of claim 1, wherein processing further includes processing the method on the first device that is a virtual machine of the one or the one or more second devices.

3. The method of claim 1, wherein processing further includes processing the method on the first device that is interfaced to a computing core of and within a housing of the one of the one or more second devices.

4. A method, comprising:
- exposing a peripheral Application Programming Interface (API) from a first device that is dedicated to providing peripheral access to a plurality of peripherals;
- providing a management interface for secure access by a remote server;
- processing peripheral commands received from one or more second devices for accessing the peripherals through the peripheral API;
- performing management instructions received through the management interface from the remote server;
- installing an update to an existing device driver for one of the peripherals in response to some of the management instructions; and
- installing a new device driver for a new peripheral added to the peripherals in response to some of the management instructions.

* * * * *